March 30, 1937. R. A. SCHULTZ 2,075,361
BEARING
Filed April 25, 1936 2 Sheets-Sheet 2
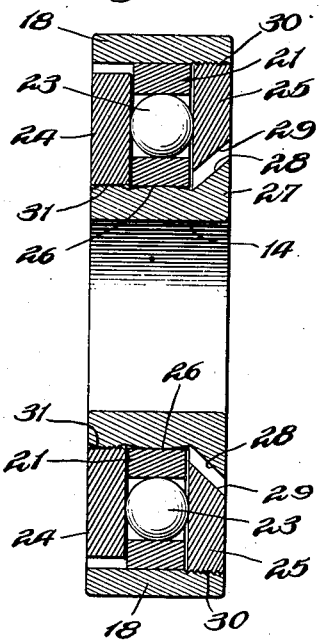
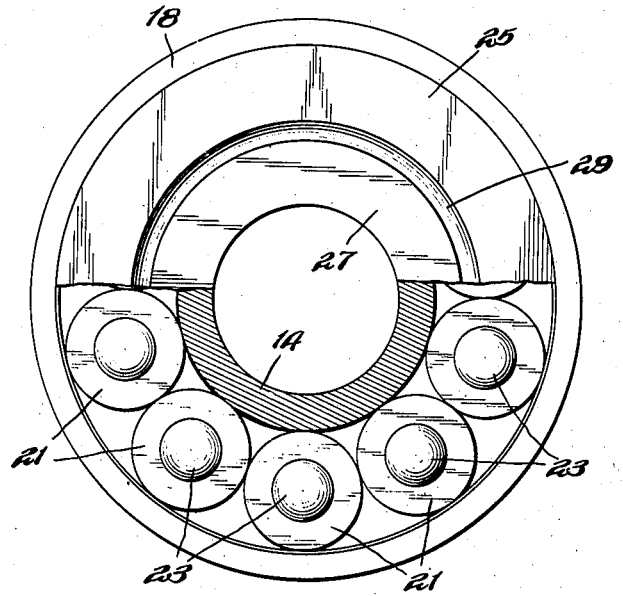
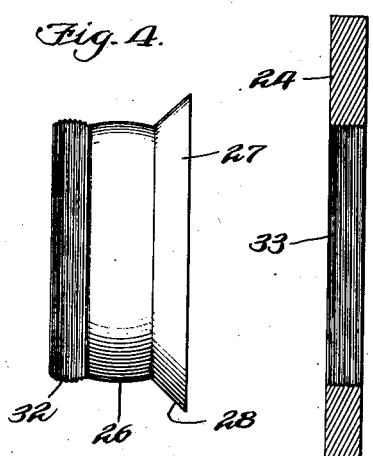
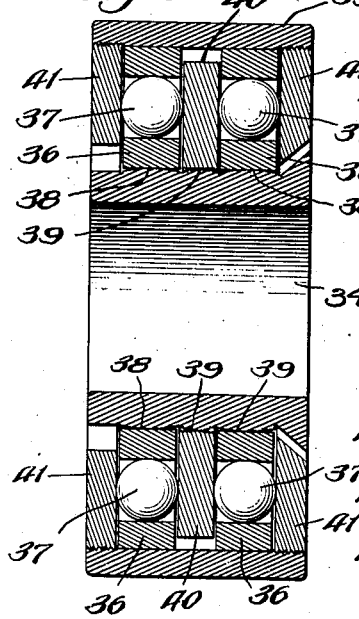
INVENTOR.
Richard A. Schultz
BY Glenn S. Noble
ATTORNEY.

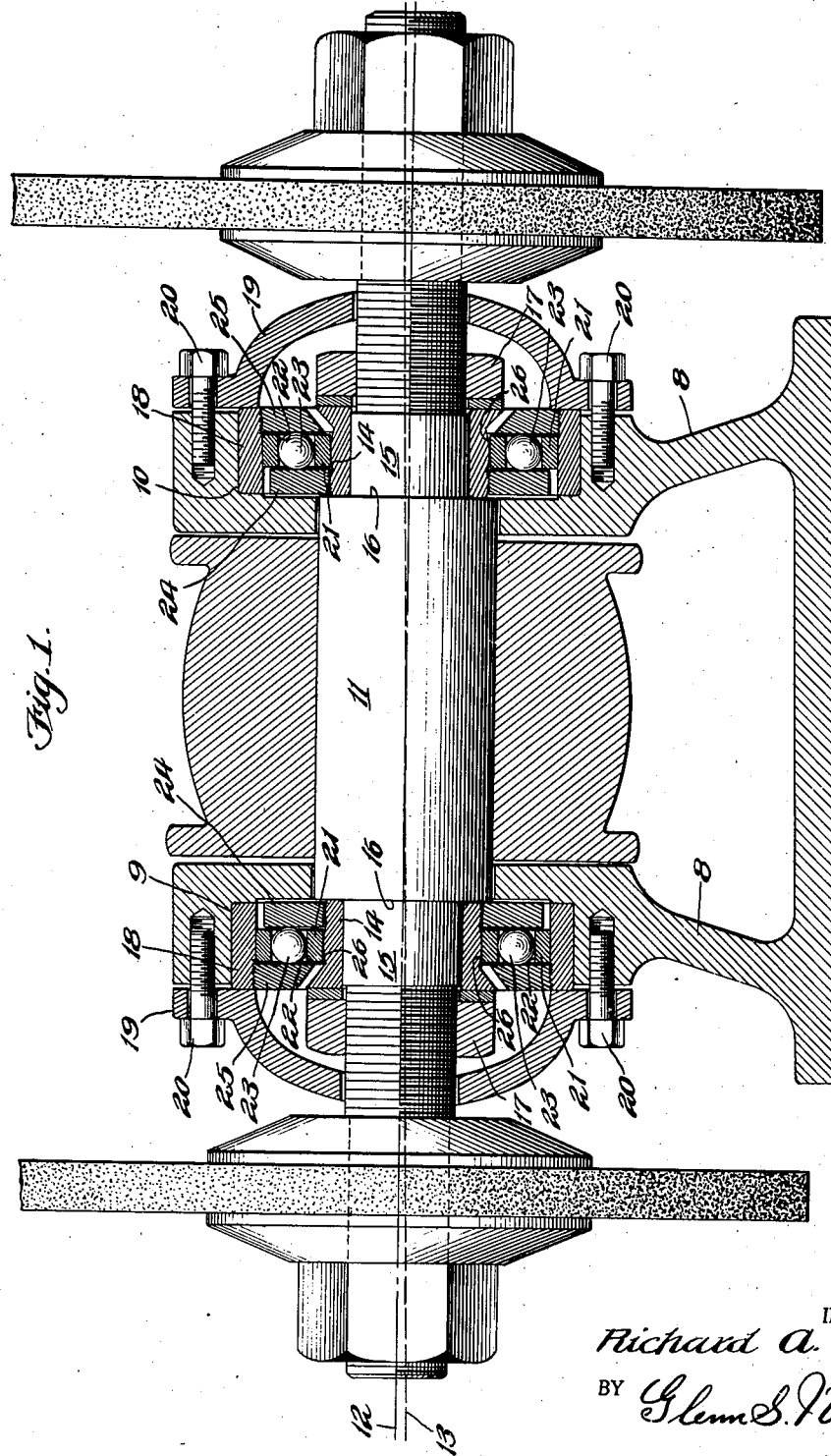

Patented Mar. 30, 1937

2,075,361

UNITED STATES PATENT OFFICE 2,075,361

BEARING

Richard A. Schultz, Chicago, Ill.

Application April 25, 1936, Serial No. 76,374

4 Claims. (Cl. 308—233)

This invention relates to bearings of the antifriction type and certain features thereof are particularly directed to such devices having combined roller and ball anti-friction members.

One of the principal objects of the present invention is to provide a bearing of the character indicated which will be particularly applicable for use in machines or bearings in which the shaft or rotatable member is out of alignment with the bearing supports or housing.

Other objects are to provide an anti-friction bearing having means for taking the thrust load as well as the radial load; to provide an anti-friction bearing having novel means for holding the parts together as for shipping and installation; to provide a bearing having combined locking and adjusting means for holding the parts with respect to longitudinal movement; to provide a combined ball and roller bearing which will be self-adjusting to accommodate axial disalignment; to provide novel means for holding a thrust ring adjustably on the central bearing member; to provide a bearing having conical rollers having central apertures for receiving thrust balls; and to provide such other improvements in construction and advantages in operation as will appear from the following description.

In the accompanying drawings illustrating this invention,

Figure 1 is a longitudinal sectional view showing my improved bearings as applied to a shaft, such as the shaft of a grinding machine;

Figure 2 is an enlarged sectional view of one of the bearings shown in Figure 1;

Figure 3 is a side view partly in section, of the bearing shown in Figure 2;

Figure 4 is a detail of the center hub or bearing ring;

Figure 5 is a sectional detail of one of the thrust washers or rings;

Figure 6 is a cross sectional view showing a modified form of construction; and

Figure 7 is a cross sectional view showing a further modified form of construction.

Figure 1 shows a grinder head or support 8 having recesses 9 and 10 in the ends thereof for receiving the bearings for the shaft 11. In order to illustrate the self-aligning characteristic of my bearings, the annular recesses 9 and 10 are shown as being slightly out of alignment, as frequently occurs in machining parts of this kind, so that the shaft 11 is slightly out of alignment as indicated by the position of the center line or axis 12 of the shaft 11 with respect to the center line or axis 13 of the bearing recesses 9 and 10.

The bearings shown in Figures 1 to 5 include inner race rings or sleeves 14 which fit tightly on the reduced portions 15 of the shaft and are held against the shoulders or abutments 16 by means of nuts 17 which engage with the threaded ends of the shaft as shown in Figure 1. The outer race rings or sleeves 18 fit in the sockets or recesses 9 and 10 and are held in position by means of end plates or housing members 19 and screws 20. A series of bearing rollers 21 are interposed between the sleeves or cylinders 14 and 18 in order to take the radial load, it being understood that these rollers are made of suitable material for the purposes indicated and fit fairly close within the race members in order to prevent any slack or chattering on the shaft.

The rollers 21 comprise short tubular sections having central longitudinal bores or openings 22 for receiving balls 23 for taking up the end thrusts. The balls 23 preferably fit closely within the rollers so as to reinforce the same or if necessary take a portion of the radial load and extend slightly beyond the faces of the rollers in order to engage with the thrust rings or washers 24 and 25.

The inner race ring or sleeve 14 has a curved or substantially spherical portion 26 for engagement with the rollers 21 to permit a certain amount of rocking or axial self-alignment between the shaft and the outer bearing sleeve 18. The inner rings or sleeves 14 are also provided at one end with flanges 27 having tapered inner faces 28 as shown in Figure 2, which are opposed to correspondingly tapered faces 29 on the inner edges of the thrust rings 25. The space between these parts provides for oiling or greasing the bearing members and furthermore these parts overlap so that the outer portion of the flange 27 will engage with the ring 25 to hold the parts together after they have been assembled.

The rings or washers 25 may be threaded around their outer periphery as shown at 30 to engage with the correspondingly threaded portion of the outer cylinders or race members 18, this threaded engagement providing for adjustment to take up longitudinal or thrust wear or such rings may be secured by pressed fit as will be readily apparent. The outer surfaces of the inner sleeves or cylinders 14 are also curved or made substantially spherical as shown at 31, for engagement with the inner peripheries of the thrust washers 24 to permit the axial alignment above referred to. The thrust rings or washers 24 are secured to the inner sleeves or cylinders 14 in any suitable manner as for instance by being pressed on or by having the curved portions 31 of the sleeves 14 provided with annular grooves 32 or knurling as shown in Figure 4, and the rings or thrust washers 24 being provided with substantially similar annular grooves, projections or knurling as indicated at 33, Figure 5.

When the bearing is to be assembled all of the parts with the exception of the thrust washers 24 are brought together and arranged substantially as shown in Figure 2, and the thrust washer is then forced into place so that all of the parts will be held together as for shipping and assembling and the complete bearings may be readily installed in position as shown in Figure 1 without having the parts becoming separated. After the bearings have been installed the radial and thrust loads will be taken by the rings and balls respectively as will be readily understood, and in the event of wear the rings or washers 25 may be pressed or turned to tighten the same. If the housing openings for the bearings are out of alignment as indicated in Figure 1, it will be seen that the rollers 21 may accommodate themselves by slight rocking movement on the curved faces 26 and likewise the thrust rings or washers 24 may accommodate themselves by a slight movement on the curved surfaces of the bearing sections 31 so that my improved bearings are particularly adapted to provide for conditions of the kind indicated and will automatically align themselves or compensate for slight variations in the centering of the shaft.

In the modification shown in Figure 6 the inner sleeve or central bearing member 34 and outer bearing ring or cylinder 35 are made sufficiently long to accommodate a plurality of sets of rollers 36 and balls 37. In this instance the inner sleeve is shown with convex bearing sections 38 for the rollers 36 and intermediate convex sections 39 for receiving the separator rings or washers 40. The inner peripheries of the rings 40 may be toothed, corrugated or knurled to hold them in adjusted position as above described. In this form of construction the end thrust rings or washers 41 and 41' are both made adjustable as shown, in order to provide for assembly as well as for adjustment in case of wear. It will be readily seen that this form also provides means for limited self-adjustment or alignment for the purposes above described.

In the form shown in Figure 7 the inner sleeve or cylinder 42 and outer sleeve or cylinder 43 are provided with tapered race-ways 44 and 45 respectively for engagement with the correspondingly tapered rollers 46. These rollers are also hollow or cylindrical for receiving balls 47 for taking up the end thrust. The end rings or washers 48 and 49 are preferably made adjustable in order to adjust the conical rollers to take up lateral or radial wear or in fitting the same, as well as for taking up the wear due to end thrust. The construction is otherwise as shown in Figure 2.

From this description it will be seen that I provide a simple and effective anti-friction bearing which may be readily manufactured and which will be particularly efficient and durable in operation, being adapted for carrying heavy loads or for end thrusts as will be readily apparent to those familiar with such devices.

While I have shown preferred forms of my invention it will be apparent that the same may be modified in order to adapt it for vehicle wheels such as automobiles, cars or the like, or for other purposes for which such bearings are adapted, and therefore I do not wish to be limited to the particular forms herein shown and described except as specified in the following claims, in which I claim:

1. In a bearing, the combination of an inner bearing member having an annular race portion which is convex longitudinally of the bearing member, and having an outwardly projecting flange at one end thereof, tubular rollers engaging with said race portion, balls in said rollers of greater diameter than the lengths of the rollers, an outer bearing cylinder having a straight bore engaging with said rollers, an end ring secured within the outer bearing member and having a portion extending inwardly and overlapping the flange to hold the parts in assembled position, and a second end ring secured to the inner bearing member on the end opposite from said first named ring, said rings engaging with the balls for taking up end thrust.

2. An anti-friction bearing comprising an inner cylindrical bearing member having an outwardly projecting flange at one end with a tapered inner face, a series of cylindrical bearing rollers engaging with the inner member, balls closely fitting in said rollers and projecting beyond the ends thereof, an outer cylindrical bearing member engaging with said rollers, an end ring having threaded connection with one end of said outer member and having a tapered inner portion opposed to the tapered face of the flange and overlapping the same, a second end ring secured to the inner bearing member and projecting outwardly, said bearing rings engaging with the opposite sides of the series of balls for the purposes described.

3. In a bearing, the combination of an inner cylindrical bearing member having a longitudinally curved annular race-way around the central portion thereof, having an outwardly projecting flange at one end thereof and having a longitudinally curved knurled outer engaging surface adjacent to the race-way, a series of tubular rollers engaging with said race-way and adapted to rock longitudinally thereon, an outer cylindrical bearing member having a cylindrical bore engaging with said series of rollers and being threaded at one end, a correspondingly threaded thrust ring engaging with the threaded end of the outer bearing member and extending inwardly and overlapping said flange, and a second thrust ring having a knurled inner periphery engaging with said engaging surface on the inner bearing member, the arrangement being such that when the last named ring is secured in position all of the parts will be held in assembled relation.

4. A bearing comprising an inner cylindrical bearing member having an outwardly projecting flange at one end, a series of cylindrical bearing rollers engaging with the inner member, balls closely fitting in said rollers and projecting beyond the ends thereof, an outer cylindrical member engaging with said rollers, an end ring adjustably mounted in said outer bearing member and overlapping said flange to assist in holding the parts in assembled relation, a second end ring secured to the inner bearing member and projecting outwardly, said bearing rings engaging with the opposite sides of the series of balls for the purposes described.

RICHARD A. SCHULTZ.